US008120477B2

(12) United States Patent
Hedrich

(10) Patent No.: US 8,120,477 B2
(45) Date of Patent: Feb. 21, 2012

(54) FLEXDOOR STATUS DISPLAY

(75) Inventor: Karl-Franz Hedrich, Saulheim (DE)

(73) Assignee: GM Global Technology Operations LLC, Detroit, MI (US)

(*) Notice: Subject to any disclaimer, the term of this patent is extended or adjusted under 35 U.S.C. 154(b) by 351 days.

(21) Appl. No.: 12/390,017

(22) Filed: Feb. 20, 2009

(65) Prior Publication Data

US 2009/0211157 A1 Aug. 27, 2009

(30) Foreign Application Priority Data

Feb. 21, 2008 (DE) ......................... 10 2008 010 396

(51) Int. Cl.
*B60Q 1/00* (2006.01)
*B60Q 25/10* (2006.01)

(52) U.S. Cl. ............... 340/438; 340/426.15; 340/426.28

(58) Field of Classification Search ............... 340/426.1, 340/426.15, 426.18, 426.28, 426.29, 438; 180/286, 287; 307/10.2, 10.4; 292/336.3, 292/92

See application file for complete search history.

(56) References Cited

U.S. PATENT DOCUMENTS 3,647,016 A 3/1972 Fitzsimons et al.
4,491,917 A * 1/1985 Higgins et al. .................. 701/49
4,709,776 A 12/1987 Metz
4,754,255 A * 6/1988 Sanders et al. ............... 307/10.4
4,896,050 A 1/1990 Shin-Chung
7,339,459 B2 * 3/2008 Jordan et al. ............. 340/426.28
7,819,442 B2 * 10/2010 Ieda et al. .................. 292/336.3

FOREIGN PATENT DOCUMENTS

DE 3438342 A1 4/1986
DE 4104119 A1 8/1992
DE 4325164 A1 12/1993
DE 102005034097 A1 8/2006
DE 102006008906 A1 9/2007
GB 1290218 9/1972
WO 2007095937 A3 8/2007

* cited by examiner

*Primary Examiner* — Van T. Trieu

(74) *Attorney, Agent, or Firm* — Ingrassia Fisher & Lorenz, P.C.

(57) ABSTRACT

A method is provided for displaying a closed state of a motor vehicle door which can adopt at least two closed states depending on driving speed, in particular a motor vehicle door, that includes, but is not limited to two door leaves which open in opposite directions to one another, that also includes, but is not limited to a lock for achieving the closed states on an electromechanical basis. The method has the steps of, without limitation, detecting an actual closed state of the motor vehicle door and signaling the actual closed state of the motor vehicle door. A status display is also provided that carries out the method, a locking system with a status display is provided, and a motor vehicle door is provided with a locking system.

14 Claims, 1 Drawing Sheet

FLEXDOOR STATUS DISPLAY

CROSS-REFERENCE TO RELATED APPLICATION

This application claims priority to German Patent Application No. 102008010396.9, filed Feb. 21, 2008, which is incorporated herein by reference in its entirety.

TECHNICAL FIELD

The invention relates to a method for displaying a closed state of a motor vehicle door in a motor vehicle. The invention further relates to a status display. In addition, the invention relates to locking system for a motor vehicle door. Furthermore, the invention relates to a motor vehicle door having a locking system.

BACKGROUND

Motor vehicle doors comprising two door leaves which are pivotable in opposite directions to one another are known from the prior art. Such motor vehicle doors are known, for example, under the trade name Flexdoor®. Such doors have electromechanically based locking systems, which satisfy safety requirements and the like. For this reason, these doors have two closed states: a closed state in which the door cannot be opened and a state in which the door is still closed, but can be opened by actuating a door handle. Due to the electromechanical configuration of the lock, a conventional door lock with an unlocking button cannot be used. The user does not know when the motor vehicle door is secured against opening and when it is not.

In view of the foregoing, it is therefore at least one object of the present invention to provide a method, which makes the possibility for opening the motor vehicle door clear to the user. It is furthermore an object of the present invention to provide a status display, which makes the possibility for opening the motor vehicle door clear to the user. In addition, it is an object of the present invention to provide a locking system, which makes the possibility for opening the motor vehicle door clear to the user. Not least, it is an object of the present invention to provide a motor vehicle door, which makes the possibility for opening the motor vehicle door clear to the user. Moreover, other objects, desirable features, and characteristics will become apparent from the subsequent summary and detailed description, and the appended claims, taken in conjunction with the accompanying drawings and this background.

SUMMARY

The embodiments of the invention include the technical teaching in that in a method for displaying a closed state of a motor vehicle door, which can adopt at least two closed states depending on a driving speed, in particular a motor vehicle door comprising two door leaves which open in opposite directions to one another, comprising a lock for achieving the closed states on an electromechanical basis, it is provided that this comprises the steps: detecting an actual closed state of the motor vehicle door and signaling the actual closed state of the motor vehicle door.

The motor vehicle door comprises two door leaves, which open in opposite directions to one another. In this case, in a closed state of the motor vehicle door, the doors leaves adjoin one another with their end regions pointing toward one another and form a closed motor vehicle door. At their end regions, which are spaced apart from one another in a closed state, the door leaves are mounted in an articulated manner, so that one door leaf can be opened in a first pivot direction and the other door leaf can be opened in another, preferably opposite, pivot direction. In their adjoining region, the door leaves can be locked with one another so that these are also closed during the journey. To this end, an electromechanical lock is provided. This locks the doors leaves to one another by means of a corresponding closing logic. The locking is effected in such a manner that this closes the door leaves in compliance with current regulations relating to safety and the like. In addition, sensors can be provided which affect a closure as a function of surrounding obstacles and the like.

The motor vehicle door has two closed states when the door leaves are closed (i.e., they adjoin one another at a preferably flush front). In one closed state, the motor vehicle door cannot be opened appropriately by actuation of an actuating mechanism by a user. In another closed state, the motor vehicle door can be appropriately opened by actuation of an actuating mechanism by the user. From the latter closed state, the motor vehicle door can be transferred from the closed state into an open state, in which access to the motor vehicle is ensured.

The method for display comprises the steps of detecting an actual closed state and signaling the actual closed state.

The detection of the actual closed state is coupled to the locking. When the locking is in a closed state, this is detected, for example, by means of sensors, stops, or the like. The detection can be computer-assisted, or effected in a wireless or wired manner. The detection preferably takes place in real time, whereby the closed state is continuously detected. Not only the first closed state and the second closed state can be detected. Rather, the transitions of the closed states, the frequency of the transitions, defective transitions, and the like are detected. The detection comprises the filing, readout, transmission and/or evaluation of the closed states.

The detected states are signaled to the user according to an embodiment of the invention. The signaling can be effected in various ways, for example, haptically, optically, olfactorily, audibly, and/or visually. The signals output during signaling can be displayed on demand, permanently or in specified or random time intervals. The signals are preferably displayed in the event of a variation of the closed state. In one embodiment, the signals are prepared on demand, for example, by actuating a switch and/or a door handle. One signal can be output interruptedly or constantly or a plurality of signals can be output successively in random or uniform sequence. The signaling is preferably effected in such a manner that the attentiveness of a driver is not substantially impaired and he can fulfill his driving duty.

In one embodiment, it is provided that the signaling is signaled by means of a visual display device comprising LED devices, LCD displays, and the like. The signals can preferably be displayed visually so that a user is not scared to clearly identify the signals, even in the dark and these do not negatively affect the driver. The visual display devices are configured to be particularly energy-saving, for example, as LED devices. The visual displays can be affected by means of numbers, differently illuminating lamps, and the like.

In a further embodiment, it is provided that the visual signaling is signaled by means of an LED device comprising respectively one LED assigned to a closed state. The LEDs are energy-saving visual display means. The LEDs are preferably configured to be differently colored. In this way, each closed state can be assigned its own coloring. In addition, the closed states can be displayed by LEDs arranged at different positions in addition to coloration. The LEDs can also illuminate differently depending on the closed state, for example, intermittently or continuously.

Another embodiment provides that the signaling is signaled in an area which is visually directly detectable for the user on actuating the motor vehicle door and/or the lock. The arrangement of the display means is effected in such a manner that a user can comfortably and directly identify and/or detect the closed state on actuating the actuating mechanism. The actuating mechanism comprises a door handle, which is disposed on the inner side of the motor vehicle door. The signaling therefore preferably takes place in the area of the door handle which the user usually has in his field of view during actuation.

The embodiment of the invention further includes the technical teaching that in a status display, means are provided for carrying out the method according to the invention. In this way, the method according to an embodiment of the invention can be achieved in a simple manner by means of a suitable status display.

In one embodiment of the status display according to an embodiment of the invention, the status display is configured for signaling a closed state of a motor vehicle door which can adopt at least two closed states depending on a driving speed, in particular for signaling a motor vehicle door comprising two door leaves which open in opposite directions to one another, comprising a lock for achieving the closed states on an electromechanical basis, it is provided that this comprises a signaling unit, which is coupled to the lock and outputs different signals depending on the closed state. The signaling unit is coupled to the lock in such a manner that this can initially detect the closed state of the lock and therefore the motor vehicle door and then signal accordingly. To this end, the signaling unit can comprise sensors, data detection or measuring devices, or the like. The sensors or other detection units transfer corresponding data to the signaling unit, which then converts the data into corresponding signals, which correspond to the closed states. The displays can be affected in various ways in accordance with those already described previously.

In one exemplary embodiment of the present invention, it is provided that the signaling unit is configured as a visual display device comprising LED devices, LCD displays, and the like. This display device can easily be implemented and accommodated in a space-saving manner.

In a further exemplary embodiment, it is provided that the visual display device is configured as an LED device comprising respectively one LED assigned to a closed state. The respective LEDs can be configured in such a manner that these illuminate with different colors, luminous intensities, illumination intervals, and the like.

Yet another exemplary embodiment provides that the display is arranged in an area which is directly detectable for the user on actuating the motor vehicle door and/or the lock, preferably an area which can be detected visually. The comfort of the user is thereby significantly improved.

The embodiment of the invention additionally includes the technical teaching that in a locking system for a motor vehicle door which can adopt at least two closed states depending on a driving speed, in particular a motor vehicle door comprising two door leaves which open in opposite directions to one another, comprising a lock for achieving the closed states on an electromechanical basis, it is provided that the locking system further comprises a status display. The status display according to an embodiment of the invention can be integrated in the locking system or can be introduced subsequently into the locking system, for example, as a replacement part, as a retrofit kit, or the like. The coupling to the locking system can be affected in a wireless manner and/or via contacts. The status display can be fastened in various ways in a motor vehicle. Thus, the status display can be attached detachably or undetachably. The attachment can be effected seamlessly, non-positively. and/or positively. The status display is preferably attached in such a manner that this does not negatively impair the visual appearance of the motor vehicle, more precisely its interior decoration. An arrangement on or in the door handle is preferred. Thus, the LEDs or other signaling units, for example, can be attached in the door handle, for example, in corresponding recesses. The arrangement can also be attached at a different location in the motor vehicle, for example, on a window breast, on a backrest, in the foot well, on the roof area, or the like.

One embodiment of the locking system according to the invention provides that the lock has an actuating mechanism for opening the lock. The actuating mechanism comprises a door handle by which means the lock can be released. The lock can be released, for example, by means of a pressing of the door handle or a first pulling. In this case, switching then takes place from a closed state in which the door cannot be opened into a closed state in which the door can be opened. The door can then be opened, for example, by means of a subsequent pulling. In this way, the locking as well as release of the locking and opening of the motor vehicle door can be achieved by means of one actuating mechanism.

Yet another embodiment provides that when a predeterminable driving speed is exceeded, the lock goes over into a state in which opening of the motor vehicle door via the actuating mechanism is not possible. Thus, for example, a limiting driving speed can be predefined, for example, 4 km/h, above which the motor vehicle door or the locking automatically switches into a closed state in which the motor vehicle door can no longer be opened. he status display indicates this transition accordingly, either automatically or on demand.

Yet another embodiment provides that on falling below the predeterminable driving speed, the lock goes over into a state in which opening of the motor vehicle door via the actuating mechanism is possible. In this case, the switching can take place independently. The locking is coupled to driving speed sensors or actuators by means of corresponding coupling means. The locking is coupled accordingly to the status display. In this way, the display is coupled accordingly to the driving speed and/or the closed state. The display can be coupled both to the closed state of the locking system and to the driving speed and also to both. In this way, failure safety is achieved so that in the event of failure of a coupling, for example, to the driving speed or the closed state, the display still shows the correct display.

Yet another embodiment of the locking system provides that the locking state is displayed on actuating the actuating mechanism. In order to save energy and not adversely affect the user or vehicle occupants by the signals, in one embodiment it is provided to display the signals on demand, possibly by actuating the door handle, by voice commands, by actuating a switch, or the like.

Not least, an embodiment of the invention includes the technical teaching that in a motor vehicle door which adopts at least two closed states depending on a driving speed, in particular a motor vehicle door comprising two door leaves which open in opposite directions to one another, it is provided that the motor vehicle door comprises a locking system. The locking system can be integrated directly into the motor vehicle door or retrofitted subsequently. The locking system can be disposed in both door leaves or only in one door leaf. Both door leaves have corresponding receptacles for the locking system. The motor vehicle door can then be integrated into a motor vehicle. Any motor vehicle can have such motor vehicle doors. In addition, a motor vehicle can be retrofitted with the motor vehicle doors. The motor vehicle doors can be side doors or rear doors. The motor vehicle doors can preferably be swung open laterally. In an alternative embodiment, it can be provided that the motor vehicle doors can also be swung upward or downward or laterally.

Further measures which improve embodiments of the invention are subsequently specified or are obtained from the following description of exemplary embodiments of the invention which are shown schematically in the figures. In this case, uniform reference numerals are used for the same or similar components or features. Features or components of various embodiments can be combined to thus obtain further embodiments. All features and/or advantages, including constructive details, spatial arrangements, and process steps following from the claims, the description, or the drawings can be important for the invention both by themselves and in various combinations.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
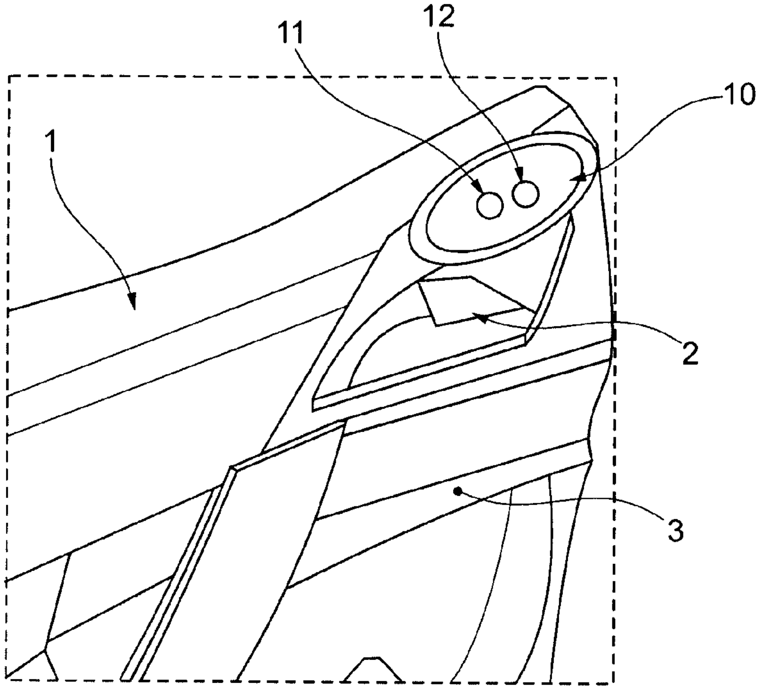
FIG. 1 shows a section of a motor vehicle door with a status display according to an embodiment of the invention in a perspective view.
Figure 2:
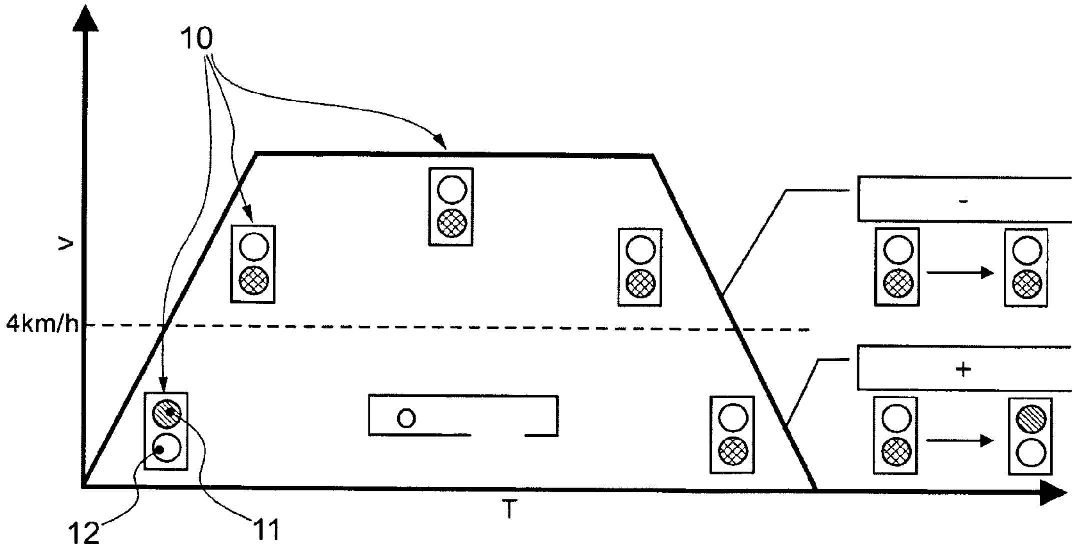
FIG. 2 shows various states of the status display according to an embodiment of the invention in a speed-time diagram in a schematic view.

FIG. 1 shows a section of a motor vehicle door 1 with a status display 2 according to an embodiment of the invention in a perspective view. The motor vehicle door 1 comprises two door leaves, of which a section of only one is shown here. The door leaves are arranged so that these open in the opposite direction to one another (i.e., one door leaf opens in a first pivot direction, for example, to the left and the other door leaf opens in a second pivot direction, for example, to the right). The door leaves are mounted accordingly at their end regions facing away from one another. The door leaves adjoin one another at their end regions facing one another so that these close substantially flush with one another and form a closed external body. Due to this oppositely directed arrangement, known as Flexdoor®, a special locking or a special locking system is necessary. This preferably functions electromechanically. The locking system preferably comprises a lock or a ratchet-and-pawl mechanism, an actuating mechanism or opening actuator, and a corresponding electronic system. The actuating mechanism comprises door handles 2, which can comprise sensors. Electrical lines can replace mechanical connections. A status display 10 is disposed above the door handle 2 on an inner cladding 3 of the motor vehicle door 1. In this case, the status display 10 is adapted to the visual appearance of the inner cladding 3 and is disposed in a viewing area which can be detected visually by a user when actuating the door handle 2. For illustration, this viewing area is characterized by an oval in FIG. 1. The status display 10, which signals a closed state of the motor vehicle door, is implemented as a visual display device, which is configured as an LED device in the present case. The LED device comprises two LEDs 11,12. A first LED 11 is assigned to a first closed state and accordingly characterizes this closed state. A second LED 12 is assigned to a second closed state and likewise accordingly characterizes this closed state. In the embodiment shown in FIG. 1, the first LED 11 is configured as a red or red-illuminating LED. The second LED 12 is configured as a green or green-illuminating LED. For example, a state can be represented by means of the red LED, in which an opening of the motor vehicle door 1 by the user is not to be performed due to predefined requirements such as safety aspects, obstacles, or the like. This display is provided so that the user is informed of this state and does not attempt to open the door forcibly or in another way which is not intended, frequently repeated in vain. The second LED, on the other hand, characterizes a state, for example, in which an opening of the motor vehicle door 1 is to be performed by the user due to predefined requirements. This display is provided so that the user is informed of this state. In this way, inappropriate use of the motor vehicle door can be prevented and the user avoids unnecessary efforts. FIG. 2 shows various states of closed states.

FIG. 2 shows schematically various states of the status display 10 according to an embodiment of the invention in a speed-time diagram. The time T is plotted on the abscissa. The driving speed V of a motor vehicle is plotted on the ordinate. A 4 km/h line is drawn parallel to the abscissa as a limiting driving speed. Above this line, no opening of the motor vehicle door 1 can take place for safety reasons. When the limiting driving speed is exceeded, the motor vehicle door 1 or the locking must be located in a state in which opening of the motor vehicle door is no longer appropriately possible for the user.

The behavior of the driving speed as a function of time is approximately as follows: at the beginning of the time axis, the speed increases from 0 km/h through the limiting driving speed of 4 km/h to a value higher than 4 km/h. Below the limiting driving speed the status display 10 shows a state in which the motor vehicle door 1 can be opened. The display is made, for example, by means of the first LED 11. In this state, the motor vehicle door 1 or the locking is located in a first closed state. The second LED 12 does not light up in this case.

As soon as the driving speed of the motor vehicle exceeds the limiting driving speed, the motor vehicle door or the locking goes over into a second closed state. The status display 10 indicates this accordingly, whereby, as shown in FIG. 2, the first LED 11 goes out and the second LED 12 lights up, for example, in a green color. This signals to the user that the motor vehicle door is secured and this cannot be appropriately opened by the user.

In the further time behavior, the driving speed remains substantially constantly above 4 km/h. The status display 10 accordingly does not change the display (i.e., the second LED 12 continues to light up while the first LED 11 remains extinguished).

As far as this behavior of the driving speed line, no actuation of the door handle is made, which is signaled by the "0" in the box. In the further behavior, the driving speed drops to 0 km/h, the curve of the driving speed intersecting the line for the limiting driving speed. Above the limiting driving speed line, which is characterized by the "–" in the box, the display remains unchanged. Even when the driving speed line remains below the limiting driving speed line, as characterized by a "+" in the box, the display remains unchanged. However, the display of the status display 10 or the closed state of the motor vehicle door/locking changes differently depending on the range on the driving speed line on actuating the door handle 2.

If the door handle 2 is actuated, when the driving speed line lies below the limiting driving speed line, the status display 10 switches over. That is, the second LED 12 goes out and the first LED 11 lights up, so that the attainment of a first closed state is signaled. This is because, on falling below the limiting driving speed line, the closed state changes, optionally as shown when actuating the door handle 2, from a second state in which opening of the motor vehicle door 1 is not possible into a first state in which opening of the motor vehicle door 1 is possible.

When the driving speed line is located above the limiting driving speed line, the status display 10 undergoes no change on actuating the door handle since the motor vehicle door 1 or the locking continues to be located in the second state in which opening of the motor vehicle door by the user is not possible in an appropriate manner. The display signals this to the user so that he does not make any futile attempts to open the motor vehicle door.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for displaying a closed state of a motor vehicle door that can adopt at least two closed states depending on a driving speed, the motor vehicle door comprising two door leaves that open in opposite directions to one another and a lock for achieving the at least two closed states on an electromechanical basis, the method comprising the steps of:

detecting an actual closed state of the at least two closed states of the motor vehicle door; and signaling the actual closed state of the at least two closed states of the motor vehicle door.

2. The method according to claim 1, wherein the signaling is conducted with a visual display device.

3. The method according to claim 2, wherein the visual display device is a LED device.

4. The method according to claim 2, wherein the visual display device is a LCD display.

5. The method according to claim 1, wherein the signaling is a visual signaling with an LED device comprising one LED assigned to the closed state.

6. The method according to claim 1, wherein the signaling is visually directly detectable for a user on actuating at least one of the motor vehicle door or the lock.

7. A status display of a motor vehicle door, comprising:

a first visual display device assigned to a first closed state; and a second visual display device assigned to a second closed state.

8. The status display according to claim 7, wherein the first visual display device is configured as an LED device.

9. A locking system for a motor vehicle door which can adopt at least two closed states depending on driving speed, the motor vehicle door comprising two door leaves which open in opposite directions to one another, comprising:

a lock adapted to achieve the at least two closed states on an electromechanical basis; and a status display comprising a first visual display device assigned to a first closed state and a second visual display device assigned to a second closed state.

10. The locking system according to claim 9, wherein the lock has an actuating mechanism for opening the lock.

11. The locking system according to claim 9, wherein when a predeterminable driving speed is exceeded, the lock transfers into a state in which opening of the motor vehicle door via the actuating mechanism is not possible.

12. The locking system according to claim 9, wherein on falling below a predeterminable driving speed, the lock transfers into a state in which opening of the motor vehicle door via the actuating mechanism is possible.

13. The locking system according to claim 9, wherein a locking state is displayed on actuating the actuating mechanism.

14. A motor vehicle door that adopts at least two closed states depending on a driving speed, comprising:

at least two door leaves that open in opposite directions to one another;

a lock adapted to achieve the at least two closed states on an electromechanical basis; and a status display comprising a first visual display device assigned to a first closed state and a second visual display device assigned to a second closed state.

* * * * *